United States Patent [19]

Richmond et al.

[11] 4,313,895

[45] Feb. 2, 1982

[54] ALKOXYLATED DIQUATERNARY AMMONIUM COMPOUNDS

[75] Inventors: James M. Richmond, Naperville; Richard A. Reck, Hinsdale; Gary A. Bernard, Bolingbrook, all of Ill.

[73] Assignee: Akzona Incorporated, Asheville, N.C.

[21] Appl. No.: 162,570

[22] Filed: Jun. 24, 1980

[51] Int. Cl.$^3$ .................... C07C 91/26; C08L 95/00
[52] U.S. Cl. .................... 260/501.15; 106/273 N
[58] Field of Search .................... 260/501.15

[56] References Cited

U.S. PATENT DOCUMENTS

| | | | |
|---|---|---|---|
| 3,028,402 | 4/1962 | Albrecht | 260/404.5 |
| 3,123,640 | 3/1964 | Longley | 260/567.6 |
| 3,123,641 | 3/1964 | Longley | 260/567.6 |
| 3,764,359 | 10/1973 | Dybalski | 106/280 |
| 3,936,503 | 2/1976 | Miller, Jr. et al. | 260/567.6 P |
| 4,022,833 | 5/1977 | Diana et al. | 260/501.17 |
| 4,085,144 | 4/1978 | Diana et al. | 260/501.17 |
| 4,139,479 | 2/1979 | Goffinet et al. | 252/8.8 |
| 4,149,978 | 4/1979 | Goffinet | 252/8.8 |
| 4,152,272 | 5/1979 | Young | 252/8.8 |
| 4,155,855 | 5/1979 | Goffinet et al. | 252/8.8 |
| 4,162,984 | 6/1979 | DeBlock et al. | 252/8.8 |

FOREIGN PATENT DOCUMENTS 953452 8/1974 Canada.

*Primary Examiner*—G. T. Breitenstein
*Attorney, Agent, or Firm*—Francis W. Young; Daniel N. Christus

[57] ABSTRACT

Asphalt emulsifying compositions comprising alkoxylated diquaternary ammonium compounds, the cationic portion of the compound preferably including aliphatic radicals containing from about 12 to about 18 carbon atoms. The compounds may be prepared by treating either a diamine or an alkoxylated diamine with an alkylene oxide in a preferred ratio of 1:8. The emulsion most suitably effected by the present compounds will preferably have a size of less than 10 microns.

7 Claims, No Drawings

ALKOXYLATED DIQUATERNARY AMMONIUM COMPOUNDS

This invention relates to a class of alkoxylated diquaternary ammonium compounds. This invention also relates to asphalt emulsions containing such alkoxylated diquaternary ammonium compounds. This invention further relates to the use of such asphalt emulsions in slurry seal mixes.

The compounds of the present invention are represented by the formula

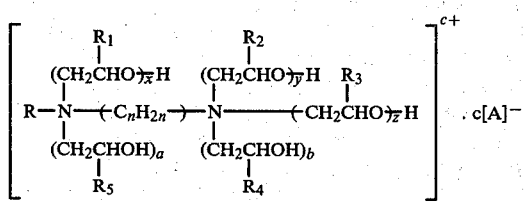

wherein R is selected from the group of aliphatic radicals containing from about 6 to about 22 carbon atoms; n is an integer of from 2 to 6; $R_1$, $R_2$, $R_3$, $R_4$ and $R_5$ are independently selected from the group consisting of hydrogen, methyl and ethyl; x, y and z are independently integers of from 1 to 50; a and b are independently 0 or 1, provided that the sum of a+b is greater than zero; c is the sum of a+b; and

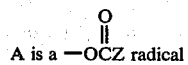

wherein Z is a lower alkyl, lower hydroxy alkyl or lower chloroalkyl.

The long chain aliphatic radicals represented by R contain from about 6 to 22 carbon atoms. Preferably, the aliphatic radicals contain from about 12 to about 18 carbon atoms. The aliphatic groups may be either "straight chain" or "branched" aliphatic radicals. In addition, the aliphatic radicals may be either saturated group, and thus alkyl, or may be unsaturated groups, and thus alkenyl. Typically, such radicals are derived from, for example, animal fatty acids such as tallow fatty acids or grease acids (Flomkoy fat), hydrogenated tallow fatty acids, and coconut fatty acids.

It is preferred that n is 3. In addition, it is preferred that x, y and z are integers from 1 to about 5 and most preferred that x, y and z are one. It is further preferred that $R_1$, $R_2$, $R_3$, $R_4$ and $R_5$ are hydrogen.

As used herein, the term "lower alkyl" refers to alkyl radicals containing from one to four carbon atoms, such as, for example, methyl, ethyl, propyl, isopropyl, butyl, sec-butyl and t-butyl. The term "lower hydroxyalkyl" as used herein, refers to an alkyl radical containing from one to four carbons wherein one of the hydrogens is replaced by a hydroxy group, such as, for example, hydroxymethyl, hydroxyethyl and the like. Groups represented by the term "lower chloroalkyl" include alkyl radical containing from one to four carbons wherein one of the hydrogens is replaced by chloro, such as, for example, chloromethyl, chloroethyl, chlorobutyl and the like. It is preferred that Z is methyl, hydroxymethyl and chloromethyl. It is most preferred that Z is methyl.

The compounds of the present invention may be prepared in accordance with the following procedure:
An alkoxylated diamine of the formula

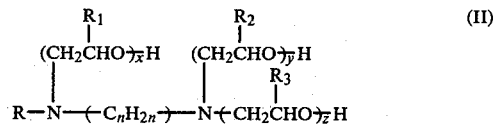

wherein R, $R_1$, $R_2$, $R_3$ and n are above defined; is treated with an acid of the formula

H-A wherein A is above defined; in the presence of water to produce a diquaternary ammonium acetate of the formula

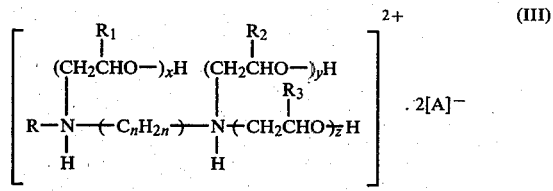

The diquaternary ammonium compound of formula (III) is treated with an alkylene oxide of the formula

wherein $R_4$ is above defined; to produce the N-alkyl-N,N'-penta(alkoxylated) diquaternary ammonium compounds of the present invention.

When a diamine of the formula

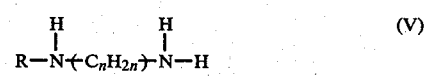

is employed in lieu of the alkoxylated diamine of formula (II) in the above procedure, a N-alkyl-N,N'-penta(alkoxylated) diquaternary ammonium compound of the formula

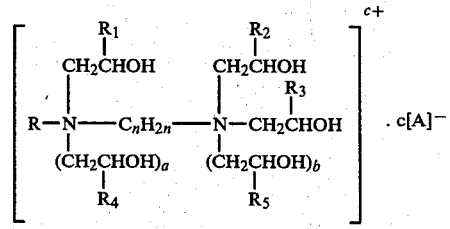

is produced. It should be noted that in order to prepare N,N'-(polyalkoxylated) ammonium compounds, that is, compounds of formula (I) wherein x, y and/or z are greater than 1, it is necessary to employ a polyalkoxylated diamine of the formula

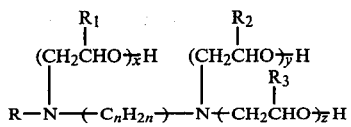

wherein at least one of x, y or z is greater than one; as the starting material in the above procedure.

The above procedure is generally carried out in a closed reaction vessel at a temperature of from 40°–130° C. with 80° C. being preferred and under a pressure in a range of 5–60 psig with 20 psig being preferred. In order to increase the rate of reaction and yield of product, an acid catalyst such as p-toluenesulfonic acid, methane sulfonic acid, sulfuric acid and the like, may be employed. For ease of reaction and recovery of products, p-toluenesulfonic acid is preferred. Although not narrowly critical, the time of reaction should be sufficient to permit the reaction to proceed to completion. A reaction time period of 6 hours is generally sufficient.

In preparing the alkoxylated diquaternary ammonium compounds of the present invention, the ratio of reactants is not narrowly critical. It is preferred that the ratio of alkoxylated diamine of formula (II) or primary diamine of formula (V) to alkylene oxide be at least 1:4 and more preferably 1:8. By varying this ratio, products wherein a or b are either 1 or 0 or both 1 may be readily obtained. As previously noted, the addition of excess alkylene oxide in the above procedures will not produce any N,N'(polyalkoxylated) compounds.

Although a solvent is not required, one may be employed to improve product handling. Illustrative of the solvents that may be employed include for example, water, mineral oil, alcohols, such as isopropanol, ethylene glycol, hexylene glycol and the like, and esters of acetic acid. For ease of reaction and recovery of product it is preferred to employ isopropanol or hexylene glycol as the solvent.

The alkoxylated diamines of formula (II) and primary diamines of formula (V) employed in accordance with the above procedures are generally commercially available and include for example, N-coco-1,3-diaminopropane
N-soya-1,3-diaminopropane
N-tallow-1,3-diaminopropane
N-oleyl-1,3-diaminopropane
N,N'-tris(2-hydroxyethyl)-N-tallow-1,3-diaminopropane
N,N'-polyoxyethylene(10)-N-tallow-1,3-diaminopropane
N,N'-polyoxyethylene(15)-N-tallow-1,3-diaminopropane The following illustrative, non-limiting examples will serve to further demonstrate to those skilled in the art the manner in which specific compounds within the scope of this invention can be prepared.

EXAMPLE 1

A 1l.-316 SS autoclave was charged with 85.95 g. (0.73 g. mole) of hexylene glycol, 95.95 g. (5.33 g. mole) water, 9.51 g. (0.050 g. mole) of p-toluenesulfonic acid monohydrate, 120.10 g. (2.00 g. mole) of glacial acetic acid, and 166 g. (0.52 g. mole) of N-tallow-1,3-diaminopropane (commercially available as Duomeen®T). The reactor was sealed and the reaction mixture was heated to 80° C. To the reaction mixture was added 114 g. (2.6 g. mole) of ethylene oxide over a one hour period of time. The pressure was allowed to rise to 50 psig. maximum and the resulting mixture was digested at 80° C. for about 9 hours. Analysis of the product mixture yielded 52.73% solids, 13.46% ethylene glycol, 1.184 meq/g quaternary acetate, 0.042 meq/g amine, and 0.139 meq/g amine acetate salt.

EXAMPLE 2

A 1l.-316 SS autoclave was charged with 58.45 g. (0.495 g. mole) of hexylene glycol, 58.45 g. (3.25 g. mole) of water, 4.75 g. (0.025 g. mole) of p-toluenesulfonic acid monohydrate, 60.05 g. (1.0 g. mole) of glacial acetic acid, and 166 g. (0.52 g. mole) of N-tallow-1,3-diaminopropane. The reactor was sealed and the reaction mixture was heated to 80° C. To the reaction mixture was added 114 g. (2.6 g. mole) of ethylene oxide added over an eight minute period at 50 psig maximum pressure. The resulting mixture was allowed to digest for an additional 4.25 hours at 80° C. An additional 45.6 g. (1.04 g. mole) of ethylene oxide was added in 22.8 g. (0.52 g. mole) increments to the reaction mixture. The reaction mixture was digested at 80° C. for about 1.5 hours after the addition of each 22.8 g. of ethylene oxide. Analysis of the reaction product yielded 62.18% solids, 18.81% ethylene glycol, 1.491 meq/g quaternary acetate, 0.262 meq/g amine, and 0.018 meq/g amine acetate.

EXAMPLE 3

To a 1l. Carp 20 autoclave was charged 200 g. (0.63 g. mole) of N-tallow-1,3-diaminopropane, 72.30 g. (1.20 g. mole) of glacial acetic acid, 32.54 g. (1.81 g. mole) of water, and 5.72 g. (0.030 g. mole) of p-toluenesulfonic acid monohydrate. The reactor was sealed, the reaction mixture heated to 80° C. To the reaction mixture was added 139 g. (3.15 g. mole) of ethylene oxide added over a 90 minute period at 20 psig. maximum pressure. The mixture was allowed to digest for an additional 90 minutes. An additional 83 g. (1.89 g. mole) of ethylene oxide was added in 27.7 g. (0.63 g. mole) increments to the reaction mixture. The reaction mixture was digested for 60 min. after the addition of each increment of ethylene oxide. Analysis of the reaction product yielded 81.4% solids, 1.669 meq/g quaternary acetate, 0.045 meq/g amine acetate, and 0.688 meq/g amine.

EXAMPLE 4

A 1l. Carp 20 steel autoclave was charged with N-tallow-1,3-diaminopropane, glacial acetic acid, water and p-toluenesulfonic acid as in Example 3, heated to 80° C. To the reaction mixture was added 194 g. (4.41 g. mole) of ethylene oxide at a rate such that 20 psig was not exceeded. The resulting mixture was digested until 0 psig was obtained, after which time the mixture was diluted with 15.6 g. of isopropyl alcohol. Analysis of the reaction product yielded 76.7% solids, 1.675 meq/g quaternary acetate, 18.5% ethylene glycol and had a pour point of 33° F., a freezing point of 28° F., a pH of 7.9, Gardner color of 9–10, with viscosity of 1740 cps at 25° C. and 450 cps at 50° C.

EXAMPLE 5

To a 316 SS autoclave was charged 325 g. (0.72 g. mole) of N,N'-tris (2-hydroxyethyl)-N-tallow-1,3-diaminopropane (commercially available as Ethoduomeen®T/13), glacial acetic acid (73.1 g.), (1.22 g. mole) 65.8 g. (3.65 g. mole) of water, and 11.6 g. (0.06 g. mole) of p-toluenesulfonic acid. The reactor was sealed and the reaction mixture was heated to 90° C. To the reaction mixture was added 154 g. (3.51 g. mole) of ethylene oxide at 20-25 psig maximum pressure. The resulting mixture was allowed to digest at 90° C. for three hours. Analysis of the reaction product yielded 73.2% solids, 1.22 meq/g quaternary acetate, 0.44 meq/g amine, 0.03 meq/g amine acetate, 29.8% ethylene glycol, and 1.5% diethyleneglycol.

EXAMPLE 6

A steel reactor was charged with 20 kg. of N-tallow-1,3-diamino propane, 7.5 kg. of glacial acetic acid, 3.4 kg. of water, 5.9 kg. of p-toluenesulfonic acid and 0.36 kg. of isopropanol. The reactor was sealed and the reaction mixture was heated to 80° C. at a maximum pressure of 20 psig ethylene oxide. To the reaction mixture was then added 19 kg. of ethylene oxide over a 4.5 hr. period. The resulting mixture was allowed to digest for an additional 6 hrs. and was then diluted with 4 kg. of isopropanol to yield a product having the following analysis: 1.487 meq/g quaternary acetate, 0.364 meq/g amine, 0.023 meq/g amine acetate, 9.6% ethylene glycol, 2.4% water, 75.8% solids, 95 F cloud point, 14.8 F pour point with Gardner 11 color.

It has been found that the compounds of the present invention are effective emulsifying agents. In particular, the compounds of the present invention are effective emulsifying agents when used in asphalt emulsions. In addition, the compounds of the present invention are less corrosive than similar compounds which contain conventional anions such as chloride. The fact that the compounds of the present invention are less corrosive than similar chloride compounds is unexpected and advantageous to the art. The asphalt emulsions of the present invention comprise (a) a bituminous binder material, (b) water, and (c) a compound of formula (I) as an emulsifying agent. The compounds of formula (I) when employed as emulsifying agents in asphalt emulsions may be used either alone or in combination with one another in the practice of this invention. The amount of emulsifying agent which is used in the emulsions of the present invention should be sufficient to emulsify an bituminous binder in an aqueous phase. The amount of emulsifying agent employed is readily ascertained by one of ordinary skill in the art and will vary between 0.1% to 5.0% based on the weight of the emulsion.

Illustrative of the bituminous binder materials employed in the asphalt emulsions of the present invention include bitumine, natural asphalt, petroleum still residues of crude oil, plastic residues from coal tar distillation, petroleum pitch, solutions of said substances by cutback asphalt, mineral waxes, and the like. The preferred bituminous binder material is asphalt of paving grade having a penetration of between 40 and 300 as determined by ASTM test number D5-73, Penetration of Bituminous Materials. The production selection and properties of the suitable petroleum drived asphalts for use in accordance with the present invention are commonly known and are described in the literature. The amount of bituminous binder material used in the asphalt emulsions of the present invention will generally range between about 20% and 80%, based on the weight of the asphalt emulsion composition and is preferably from about 50% to about 70% by weight.

Other additives commonly used in aqueous asphalt emulsions may also be employed in the practice of the present invention. For example, an inorganic salt such as calcium chloride, ammonium chloride, ammonium acetate, ammonium sulfate, sodium sulfate and the like can be added to the asphalt emulsions of the present invention in an amount up to about 2% by weight, in order to prolong the emulsion stability and improve the storage stability. Also, organic salts such as fatty amine salts may be used. Such inorganic or organic salt additives should be water soluable.

The emulsifying agents may be added to the bituminous binder material or to the aqueous portion of the asphalt emulsion. It is preferred to add the compounds of the present invention to the water in an amount necessary to produce an aqueous phase containing from about 0.1 to about 5.0 percent, and preferably from about 0.25 to about 2.0, percent by weight of the emulsifier. The resulting emulsifying solution, with or without the addition of other conventional additives, then can be utilized to prepare the asphalt emulsions of the present invention. A satisfactory method of preparing the emulsions in the practice of this invention is to maintain the bituminous binder material at a temperature of from 180° F. to about 350° F., the preferred temperature being about 250° F. The emulsifying agent and other additives, if any, may then be added to the continuous water phase which is maintained at a temperature of about 32° F. to about 212° F. and preferably from about 115° F. to about 125° F. The aqueous solution containing the emulsifying agent may then be blended with the bituminous binder. Then preferred to agitate the composition during the blending such as by means of a homogenizer.

The particle size of the emulsions which may be utilized in the practice of this invention is not particularly critical. Generally, particle size will range from between 0.5 micron to 100 microns in diameter. It is preferred to use an emulsion having a particle size of less than 10 microns.

The pH of the emulsions using the practice of this invention may range from about 1 to about 10, with a range of from about 2 to about 7 being preferred. The emulsions are generally somewhat more stable and possess better viscosity characteristics when the pH is on the acid side. However, neutral or alkaline emulsions may also be used.

The asphalt emulsions of the present invention are prepared by admixing a compound of formula (I) and water and then contacting the admixture with a petroleum derived asphalt. Examples 6 and 7 illustrate asphalt emulsifier compositions containing the compounds of the present invention.

EXAMPlE 7

|  | % by weight |
|---|---|
| Lion AC-20 | 60% |
| water | 39.4% |
| N-tallow-N,N'-penta(2-hydroxyethyl)-1,3-propylene diammonium diacetate | 0.6% |

The following results were obtained employing ASTM (D2397-79) testing procedures:

| 24 hr. quality | less than 1% |
|---|---|
| Viscosity, SSF@77° F. | 22 |
| Sieve Test | 0.02% |
| Cement Mixing Test | 0.1% |

EXAMPLE 8

| | % by weight |
|---|---|
| Lion AC-20 | 62% |
| water | 37.4% |
| N-tallow,N,N'penta(2-hydroxyethyl)-1,3-propylene diammonium diacetate | 0.6% |

The following results were obtained employing ASTM (D2397-79) testing procedures:

| 24 hr. quality | less than 1% |
|---|---|
| Viscosity, SSF@77° F. | 56 |
| Sieve Test | 0.02% |
| Cement Mixing Test | 0.1% |

The asphalt emulsions of the present invention may be employed in slurry seal mixes in accordance with the International Slurry Seal Association Guide Specification A105, January 1979.

A slurry seal mix of the present invention comprises (a) an asphalt emulsion of the present invention; (b) a mineral aggregate and (c) water. Mineral fillers such as Portland Cement, limestone dust, fly ash and the like are considered as part of the blended aggregate. The specific amounts of each component in the slurry seal mixes of the present invention will vary depending on factors such as the type of mineral aggregate, composition of the asphalt emulsion, temperature of treated surface, environmental conditions, setting time desired and the like. Selection of proper amounts of each component is readily ascertained by one of ordinary skill in the art. It is preferred that the amount of asphalt emulsion be in a range of 12%–30% by weight of aggregate with 16–20% by weight of aggregate being preferred.

As evidenced in Examples 7 and 8, the compounds of the present invention are effective emulsifier when employed in asphalt emulsion compositions. In addition, the asphalt emulsion compositions as the present invention, are effective in slurry seal mixes.

Although this invention has been described with respect to specific modifications, the details thereof are not to be construed as limitation, for it will be apparent that various equivalents, changes and modifications may be resorted to without departing from the spirit and scope thereof and it is understood that such equivalent embodiments are intended to be included herein.

What is claimed is:

1. A compound of the formula

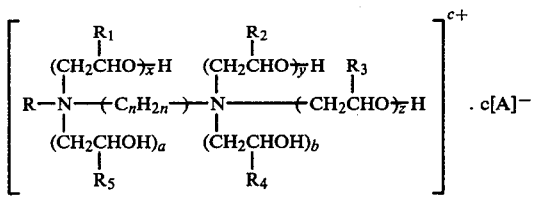

wherein R is selected from the group of aliphatic radicals containing from about 6 to about 22 carbon atoms; n is an integer of from 2 to 6; $R_1$, $R_2$, $R_3$, $R_4$ and $R_5$ are independently selected from the group consisting of hydrogen, methyl and ethyl; x, y and z are independently integers of from 1 to 50; a and b are independently 0 or 1, provided that the sum of a+b is greater than zero; c is the sum of a+b; and $$A \text{ is a } -\overset{\overset{O}{\|}}{O}CZ \text{ radical}$$

wherein Z is a lower alkyl, lower hydroxy alkyl or lower chloroalkyl.

2. A compound of claim 1 wherein Z is methyl.

3. A compound of claim 2 wherein x, y and z are independent integers of from 1 to 5.

4. A compound of claim 3 wherein x, y and z are 1 and n is 3.

5. A compound of claim 4 wherein $R_1$, $R_2$, $R_3$, $R_4$ and $R_5$ are hydrogen.

6. A compound of claim 1, 2, 3, 4 or 5 wherein R is selected from the group consisting of aliphatic radicals containing from about 12 to about 18 carbon atoms.

7. A compound of claim 6 wherein the compound is N-tallow-N,N'penta(2-hydroxyethyl)-1,3-propylene diammonium diacetate.

* * * * *